(12) United States Patent
Aoyagi

(10) Patent No.: US 7,127,210 B2
(45) Date of Patent: Oct. 24, 2006

(54) WIRELESS COMMUNICATION APPARATUS

(75) Inventor: Kazunori Aoyagi, Fussa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 576 days.

(21) Appl. No.: 10/096,678

(22) Filed: Mar. 14, 2002

(65) Prior Publication Data

US 2003/0114107 A1 Jun. 19, 2003

(30) Foreign Application Priority Data

Sep. 20, 2001 (JP) ............... 2001-287376

(51) Int. Cl.
*H04B 7/00* (2006.01)

(52) U.S. Cl. ............ 455/41.2; 455/403; 455/417; 370/259; 370/260; 370/261

(58) Field of Classification Search .......... 455/403, 455/450, 410, 41.2, 41.3, 416, 417; 370/259, 370/260, 261, 262, 263, 264, 265, 266, 267, 370/268, 269, 270

See application file for complete search history.

(56) References Cited

U.S. PATENT DOCUMENTS

2002/0164953 A1 * 11/2002 Curtis ................... 455/41
2003/0054794 A1 * 3/2003 Zhang .................. 455/403

FOREIGN PATENT DOCUMENTS

| JP | 2000-209646 | 7/2000 |
| JP | 2001-189974 | 7/2001 |
| JP | 2000-018082 | 1/2002 |

* cited by examiner

*Primary Examiner*—Matthew D. Anderson
*Assistant Examiner*—Sanh Phu
(74) *Attorney, Agent, or Firm*—Finnegan, Henderson, Farabow, Garrett & Dunner. L.L.P.

(57) ABSTRACT

This invention relates to a wireless communication apparatus including a discovery unit which discovers the completion of connection with another wireless communication apparatus, a mode setup unit which sets up a mode which defines processing for a signal for performing communication with the wireless communication apparatus from a wireless communication apparatus except for another wireless communication apparatus, and a shift unit which shifts to the mode set up by the mode setup unit when the discovery unit discovers the completion of connection.

21 Claims, 5 Drawing Sheets

| Unique address | Mode selected upon connection establishment |
|---|---|
| Unique address A | Non-connectable mode 1 |
| Unique address B | Non-discoverable mode |
| Unique address C | Non-connectable mode 2 |
| Unique address D | Non-discoverable mode |
| Unique address E | Non-connectable mode 1 |
| ⋮ | ⋮ |

WIRELESS COMMUNICATION APPARATUS

CROSS-REFERENCE TO RELATED APPLICATIONS

This application is based upon and claims the benefit of priority from the prior Japanese Patent Application No. 2001-287376, filed Sep. 20, 2001, the entire contents of which are incorporated herein by reference.

BACKGROUND OF THE INVENTION

1. Field of the Invention

The present invention relates to a wireless communication apparatus and, more particularly, to a wireless communication apparatus which, after establishing connection with another wireless communication apparatus, automatically changes setups for discovery or connection with respect to still another wireless communication apparatus except for the connected wireless communication apparatus.

2. Description of the Related Art

The Bluetooth technique capable of achieving short-distance wireless communication between a plurality of wireless communication apparatuses has recently been developed along with the development of the wireless communication technology. An example of techniques adopting the Bluetooth technique is Jpn. Pat. Appln. KOKAI Publication No. 2001-189974.

Regarding the process up to establishing connection between wireless communication apparatuses in Bluetooth which is one of wireless communication schemes, the prior art reads, "To communicate with another device, a given device makes an inquiry to check whether a device equipped with Bluetooth exists in a range where its radio waves can reach. The device checks an inquiry from another device by inquiry scan, and responds to the inquiry by an inquiry response function. The device can know the 48-bit address of the partner through an inquiry response which transmits an FHS (Frequency Hopping Synchronization) packet. Connection is set between these devices by the address. The paging device which wants to set connection starts a page process by using a specific address. At this time, the paged device periodically performs page scan. Since the normal page period is longer than the page scan period, the paged device can set connection with the paging device Upon recognizing through page scan that it has been paged, the paged device immediately starts a process of setting connection. In a normal state, connection is set."

As described above, when wireless communication apparatuses are to communicate with each other, the first wireless communication apparatus which wants to perform wireless communication sends an inquiry signal to peripheral wireless communication apparatuses. The second wireless communication apparatus which has received the inquiry signal sends back a response to the first wireless communication apparatus. The first wireless communication apparatus receives the response to the inquiry, and discovers the wireless communication apparatus which exists near itself. To request connection, the first wireless communication apparatus sends a page signal to the second wireless communication which has sent back the response. Then, the second wireless communication apparatus receives the page signal, and sends back a page response to the first wireless communication apparatus. Connection between the wireless communication apparatuses is established through this process, and wireless communication is enabled.

Bluetooth assumes that a wireless communication apparatus establishes connections with a plurality of wireless communication apparatuses and communicates with them. Even if a wireless communication apparatus establishes connection with another wireless communication apparatus and does not want to be connected to still another wireless communication apparatus, the wireless communication apparatus performs response processing to an inquiry or page sent from still another wireless communication apparatus. This may interfere with communication with the currently connected wireless communication apparatus.

When authentication is set to be performed in connection, the wireless communication apparatus is prompted to input an authentication code every time it receives a page from another wireless communication apparatus. This forces the user to perform an unwanted operation.

BRIEF SUMMARY OF THE INVENTION

An object of the present invention is to provide a communication apparatus which, after establishing connection with a wireless communication apparatus, controls connection establishment with another wireless communication apparatus.

To achieve the above object, according to a first aspect of the invention, there is provided a communication apparatus comprising means for discovering completion of connection with another wireless communication apparatus, mode setup means for setting up a mode which defines processing for a signal for performing communication with the wireless communication apparatus from a wireless communication apparatus except for the another wireless communication apparatus, and means for shifting to the mode set up by the mode setup means when the discovery means discovers the completion of connection.

According to a second aspect of the invention, there is provided a communication method in a communication apparatus, comprising discovering completion of connection with another wireless communication apparatus and inhibiting connection with a wireless communication apparatus except for the another wireless communication apparatus.

According to the present invention, after a wireless communication apparatus establishes communication with another wireless communication apparatus, it can inhibit communication with still another wireless communication apparatus except for the currently connected wireless communication apparatus. This can prevent interference with communication with the connected wireless communication apparatus.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

First Embodiment

A wireless communication apparatus according to an embodiment of the present invention will be described below with reference to the several views of the accompanying drawing.

Figure 1:
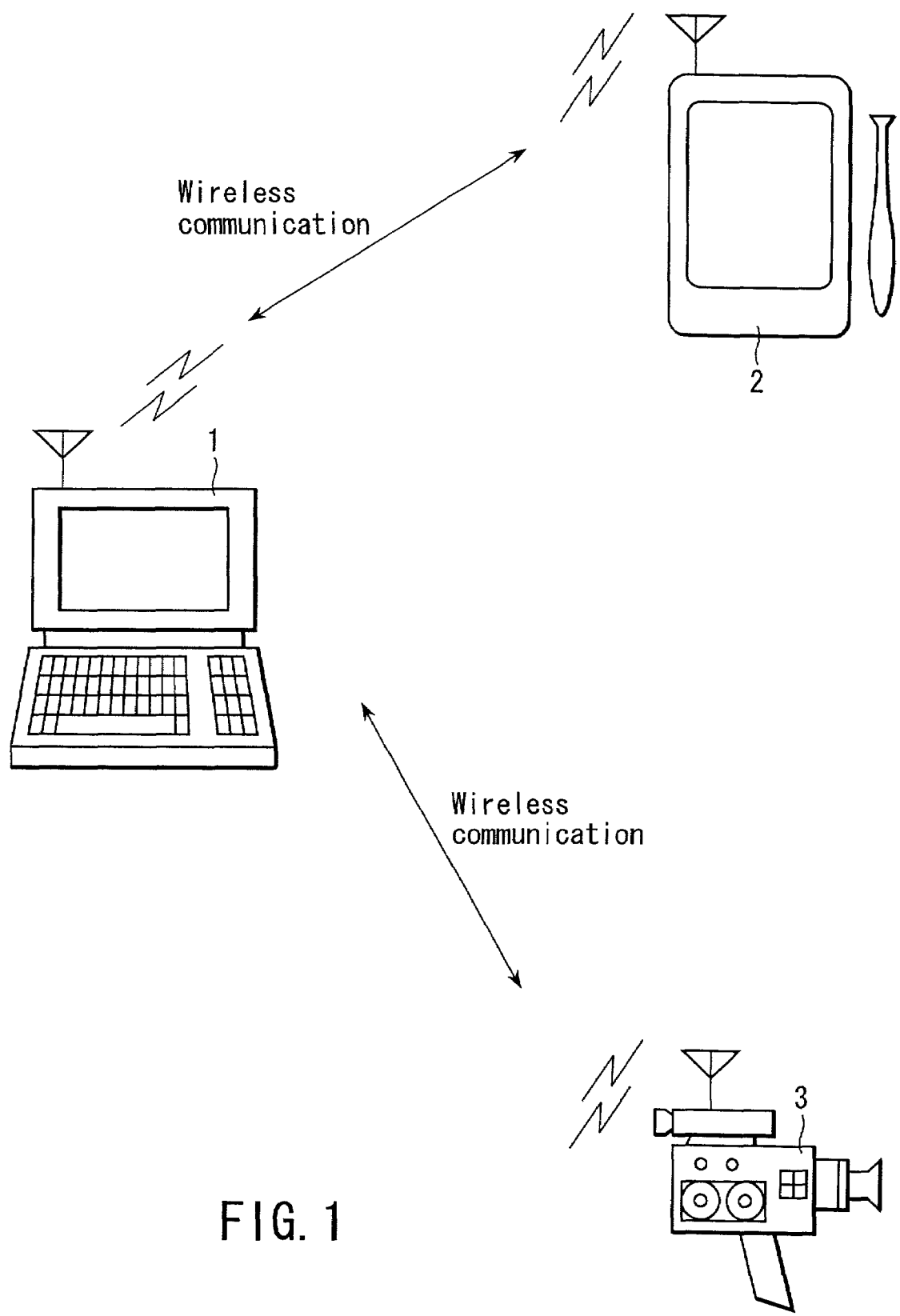
FIG. 1 is a view showing an example of the use environment of a wireless communication apparatus according to an embodiment of the present invention.

FIG. 1 is a view showing an example of the use environment of the wireless communication apparatus according to the embodiment of the present invention. In FIG. 1, a notebook type personal computer 1, PDA (Personal Digital Assistant) 2, and VTR camera 3 have Bluetooth modules, and are in a wireless communicable environment.

Figures 2, 3:
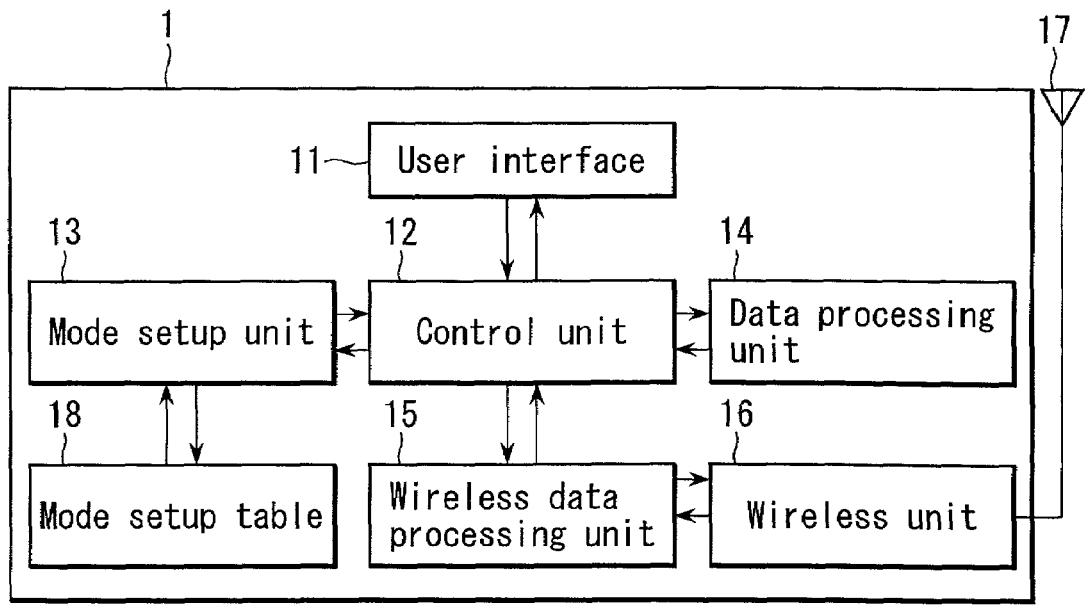
FIG. 2 is a functional block diagram showing a notebook type personal computer 1 as a wireless communication apparatus.
FIG. 3 is a table showing a mode setup table representing the relationship between a unique address and a mode selected upon connection establishment.

FIG. 2 is a functional block diagram showing the notebook type personal computer 1 as a wireless communication apparatus. Although FIG. 2 shows the notebook type personal computer 1, the PDA 2 and VTR camera 3 as other wireless communication apparatuses also have the same functions.

As shown in FIG. 2, the notebook type personal computer 1 comprises a user interface 11, control unit 12, mode setup unit 13, data processing unit 14, wireless data processing unit 15, wireless unit 16, and antenna 17.

The user interface 11 receives an inquiry or paging from the user, and sends the command to the control unit 12.

The control unit 12 sends the command from the user interface 11 as control data to the wireless data processing unit 15. The control unit 12 checks whether the received data which is demodulated and output from the wireless data processing unit 15 is control data or general data, and executes processing corresponding to the received data. If the received data is general data, the control unit 12 sends it to the data processing unit 14 which performs data processing.

If the received data is control data, the control unit 12 sends back corresponding control data to the wireless data processing unit 15, and sends the control information to the user interface 11 and mode setup unit 13.

The wireless data processing unit 15 modulates the control data and sends it to the wireless unit 16. The control data is transmitted to another wireless communication apparatus by generating radio waves from the antenna 17. The wireless data processing unit 15 demodulates received data and sends it to the control unit 12.

The wireless unit 16 uses the antenna 17 to receive radio waves generated from another wireless communication apparatus, and sends them to the wireless data processing unit 15.

When the mode setup unit 13 receives control data representing the completion of connection with another wireless communication apparatus, the mode setup unit 13 automatically changes setups for an inquiry or paging from still another wireless communication apparatus.

The setups of the mode are done for a mode setup table 18 representing the relationship between a unique address and a mode selected upon connection establishment, as shown in FIG. 3.

In FIG. 3, when connection with a device corresponding to unique address A is established, this means that the mode changes to non-connectable mode 1. When connection with a device corresponding to unique address B is established, this means that the mode changes to a non-discoverable mode.

The non-connectable mode and non-discoverable mode are defined by the Bluetooth standard. The "non-connectable mode" in which the wireless communication apparatus does not respond to a page signal from another wireless communication apparatus means that the wireless communication apparatus does not change to a page scan state. The non-discoverable mode in which the wireless communication apparatus does not respond to an inquiry signal from another wireless communication apparatus means that the wireless communication apparatus does not change to an inquiry signal response state.

The Bluetooth standard defines two types of non-connectable modes because the wireless communication apparatus either does not respond to a page or sends back a page denial upon reception of a page signal (to be described later).

When received data demodulated by the wireless data processing unit 15 concerns an inquiry or paging from another wireless communication apparatus, the control unit 12 sends a response to the inquiry or paging from the wireless communication apparatus to the wireless data processing unit 14 on the basis of a mode set up by the mode setup unit 13.

Figure 4:
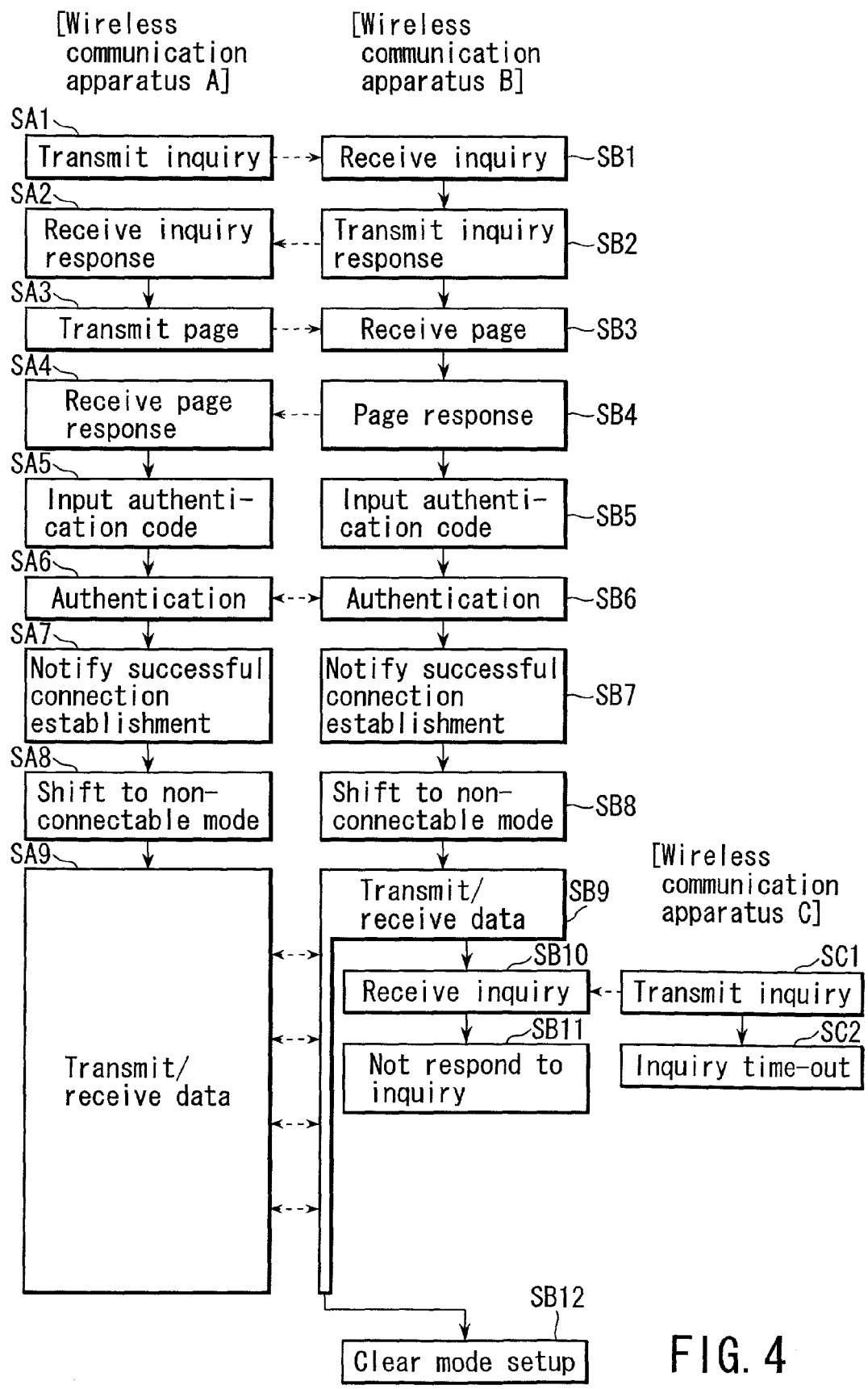
FIG. 4 is a flow chart for explaining the operation of the notebook type personal computer according to the first embodiment of the present invention.

The operation of the notebook type personal computer according to the first embodiment of the present invention will be explained with reference to the flow chart of FIG. 4. In FIG. 4, the notebook type personal computer 1 is described as a wireless communication apparatus A; the PDA 2, as a wireless communication apparatus B; and the VTR camera 3, as a wireless communication apparatus C.

The user of the wireless communication apparatus A which is to start wireless communication instructs the control unit 12 through the user interface 11 to check wireless communication apparatuses present around the wireless communication apparatus A. The control unit 12 generates inquiry data upon reception of the request through the user interface 11. The inquiry data is sent to the wireless data processing unit 15 where it is modulated. The modulated inquiry data is sent to the wireless unit 16 and transmitted from the antenna 17 (SA1).

The wireless communication apparatus B receives the inquiry transmitted from the wireless communication apparatus A, and outputs the received inquiry from the wireless unit 16 to the wireless data processing unit 15. The wireless data processing unit 15 demodulates the received inquiry and sends it to the control unit 12 (SB1).

The control unit 12 of the wireless communication apparatus B determines that the inquiry has been received. Then, the control unit 12 generates inquiry response data including the unique address of the wireless communication apparatus B and sends it to the wireless data processing unit 15. The wireless data processing unit 15 modulates the inquiry response data and sends the modulated inquiry response data to the wireless unit 16. The inquiry response data is transmitted from the antenna 17 (SB2).

The wireless communication apparatus A receives by the antenna 17 the inquiry response transmitted from the wireless communication apparatus B. The received inquiry response is sent from the wireless unit 16 to the wireless data processing unit 15. The wireless data processing unit 15 modulates the received inquiry response and sends it to the control unit 12. The control unit 12 determines that the inquiry response has been received (SA2), and sends unique address information of the wireless communication apparatus B included in the received inquiry response to the user interface 11. The user interface 11 displays the unique address information of the wireless communication apparatus B.

The user of the wireless communication apparatus A which wants connection with the wireless communication apparatus B designates the unique address of the wireless communication apparatus B as a destination through the user interface 11, and sends a paging signal to the control unit 12. The control unit 12 generates page data to the wireless communication apparatus B and sends it to the wireless data processing unit 15. The page data modulated by the wireless data processing unit 15 is sent to the wireless unit 16 and transmitted from the antenna 17 (SA3).

The wireless communication apparatus B receives by the antenna 17 the page transmitted from the wireless communication apparatus A. The received page is demodulated by the wireless data processing unit 15 and sent to the control unit 12. The control unit 12 determines that the page has been received (SB3). The control unit 12 generates page response data and sends it to the wireless data processing unit 15. The page response data modulated by the wireless data processing unit 15 is sent to the wireless unit 16 and transmitted from the antenna 17 (SB4).

The wireless communication apparatus A receives by the antenna 17 the page response transmitted from the wireless communication apparatus B. The received page response is demodulated by the wireless data processing unit 15 and sent to the control unit 12. The control unit 12 determines that the page response has been received (SA4). If authentication is necessary, the control unit 12 causes the user interface 11 to display an authentication code input request. The user of the wireless communication apparatus A inputs the authentication code (SA5). The wireless communication apparatus A exchanges the authentication data with the wireless communication apparatus B and performs authentication (SA6).

After the wireless communication apparatus B transmits the page response, it causes the user interface 11 to display an authentication code input request if authentication with the wireless communication apparatus A is necessary. The user of the wireless communication apparatus B inputs the authentication code (SB5). The wireless communication apparatus B exchanges the authentication data with the wireless communication apparatus A and performs authentication (SB6).

If authentication in steps SA6 and SB6 succeeds, the wireless communication apparatuses A and B determine that connection is established, and send connection establishment information to their user interfaces 11. The user interfaces 11 of the respective wireless communication apparatuses notify the users of the wireless communication apparatuses of connection establishment (SA7 and SB7).

If the control unit 12 determines in step SA7 in the wireless communication apparatus A or in step SB7 in the wireless communication apparatus B that connection has been established, the control unit 12 notifies the mode setup unit 13 of connection establishment. In the wireless communication apparatus A, the mode setup unit 13 sends to the control unit 12 an instruction for shifting to the non-discoverable mode, in accordance with a mode setup set in the mode setup table 18 in advance. Similarly in the wireless communication apparatus B, the mode setup unit 13 sends to the control unit 12 an instruction for shifting to the non-discoverable mode. Note that the mode setup tables 18 of the wireless communication apparatuses A and B are so set as to shift the mode to the non-discoverable mode when connection is established between the wireless communication apparatuses A and B. After connection is established between the wireless communication apparatuses A and B, the mode automatically shifts to the non-discoverable mode (SA8 and SB8). After connection establishment, data is exchanged between the wireless communication apparatuses A and B (SA9 and SB9).

If the third wireless communication apparatus C wants connection with the wireless communication apparatus B, the wireless communication apparatus C transmits an inquiry in step SC1 similarly to step SA1 of the wireless communication apparatus A.

In step SB10, the wireless communication apparatus B receives the inquiry from the wireless communication apparatus C by the same procedure as that in step SB1. The wireless communication apparatus B has received the inquiry from the wireless communication apparatus C, but the control unit 12 does not generate any response data to the inquiry because the wireless communication apparatus B has shifted to the non-discoverable mode. In step SB11, the wireless communication apparatus B does not transmit any inquiry response.

Since the wireless communication apparatus C cannot receive any inquiry response from the wireless communication apparatus B, it cannot discover the wireless communication apparatus B. In step SC2, an inquiry time-out occurs. The wireless communication apparatus C cannot acquire the unique address of the wireless communication apparatus B, and cannot request connection. The wireless communication apparatus C does not interfere with data transmission/reception between the wireless communication apparatuses A and B in steps SA9 and SB9.

After data transmission/reception between the wireless communication apparatuses A and B in steps SA9 and SB9 ends, the mode setup, i.e., non-discoverable mode is cleared in the wireless communication apparatus B (SB12). The wireless communication apparatus B shifts to a normal mode.

The wireless communication apparatus according to the first embodiment shifts to the non-discoverable mode after connection establishment. This can prevent interference with communication with a connected wireless communication apparatus.

Second Embodiment

Figure 5:
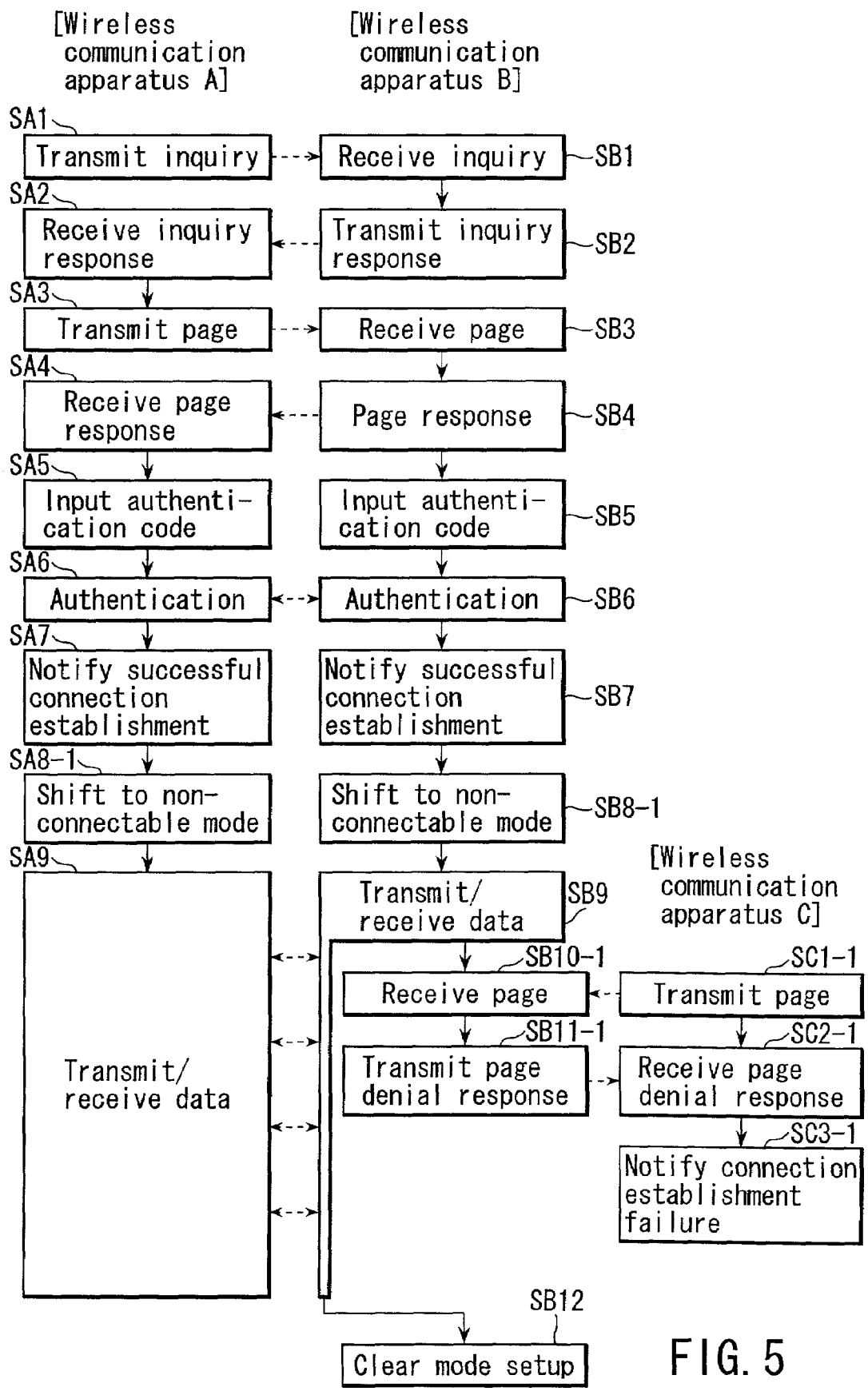
FIG. 5 is a flow chart for explaining the operation of a wireless communication apparatus according to the second embodiment of the present invention.

The operation of a wireless communication apparatus according to the second embodiment of the present invention will be described with reference to the flow chart of FIG. 5.

The process up to establishing connection between wireless communication apparatuses A and B, i.e., the process from step SA1 to step SA7 and from step SB1 to step SB7 is the same as that shown in FIG. 4.

If a control unit 12 determines in step SA7 in the wireless communication apparatus A or in step SB7 in the wireless communication apparatus B that connection has been established, the control unit 12 notifies a mode setup unit 13 of connection establishment. In the wireless communication apparatus A, the mode setup unit 13 sends, to the control unit 12 in accordance with a preset mode setup, an instruction for shifting to the non-connectable mode in which the wireless communication apparatus A sends a denial response to the received page. Also in the wireless communication apparatus B, the mode setup unit 13 sends to the control unit 12 an instruction for shifting to the non-connectable mode in which the wireless communication apparatus B sends a denial response to the received page. Note that mode setup tables 18 of the wireless communication apparatuses A and B are so set as to shift the mode to the non-connectable mode when connection is established between the wireless communication apparatuses A and B. After connection is established between the wireless communication apparatuses A and B, the mode automatically shifts to the non-connectable mode in which the wireless communication apparatus sends a denial response to a received page (SA8-1 and SB8-1).

Assume that a third wireless communication apparatus C wants connection with the wireless communication apparatus B. Further, assume that the wireless communication apparatus C acquires the unique address of the wireless communication apparatus B in advance by sending an inquiry and receiving an inquiry response before the wireless communication apparatus B shifts to the non-discoverable mode.

In step SC1-1, the wireless communication apparatus C designates the unique address of the wireless communication apparatus B and transmits a page. In step SB10-1, the wireless communication apparatus B receives the page from the wireless communication apparatus C. However, the wireless communication apparatus B has already shifted to the non-connectable mode. Thus, the control unit 12 generates a page denial response data (SB10-1) and transmits the page denial response (SB11-1).

The wireless communication apparatus C receives the page denial response from the wireless communication apparatus B (SC2-1). Since connection establishment fails, the control unit 12 notifies a user interface 11 of the connection establishment failure, and causes the user interface 11 to display the connection establishment failure (SC3-1). The wireless communication apparatus C cannot establish connection with the wireless communication apparatus B. The wireless communication apparatus C does not interfere with data transmission/reception between the wireless communication apparatuses A and B in steps SA9 and SB9.

After data transmission/reception between the wireless communication apparatuses A and B in steps SA9 and SB9 ends, the mode setup, i.e., non-discoverable mode is cleared in the wireless communication apparatus B (SB12). The wireless communication apparatus B shifts to a normal mode.

The wireless communication apparatus according to the second embodiment shifts to the non-connectable mode after connection establishment, and transmits a page denial signal in response to a page signal from another wireless communication apparatus. This can prevent interference with communication with a connected wireless communication apparatus.

Third Embodiment

Figure 6:
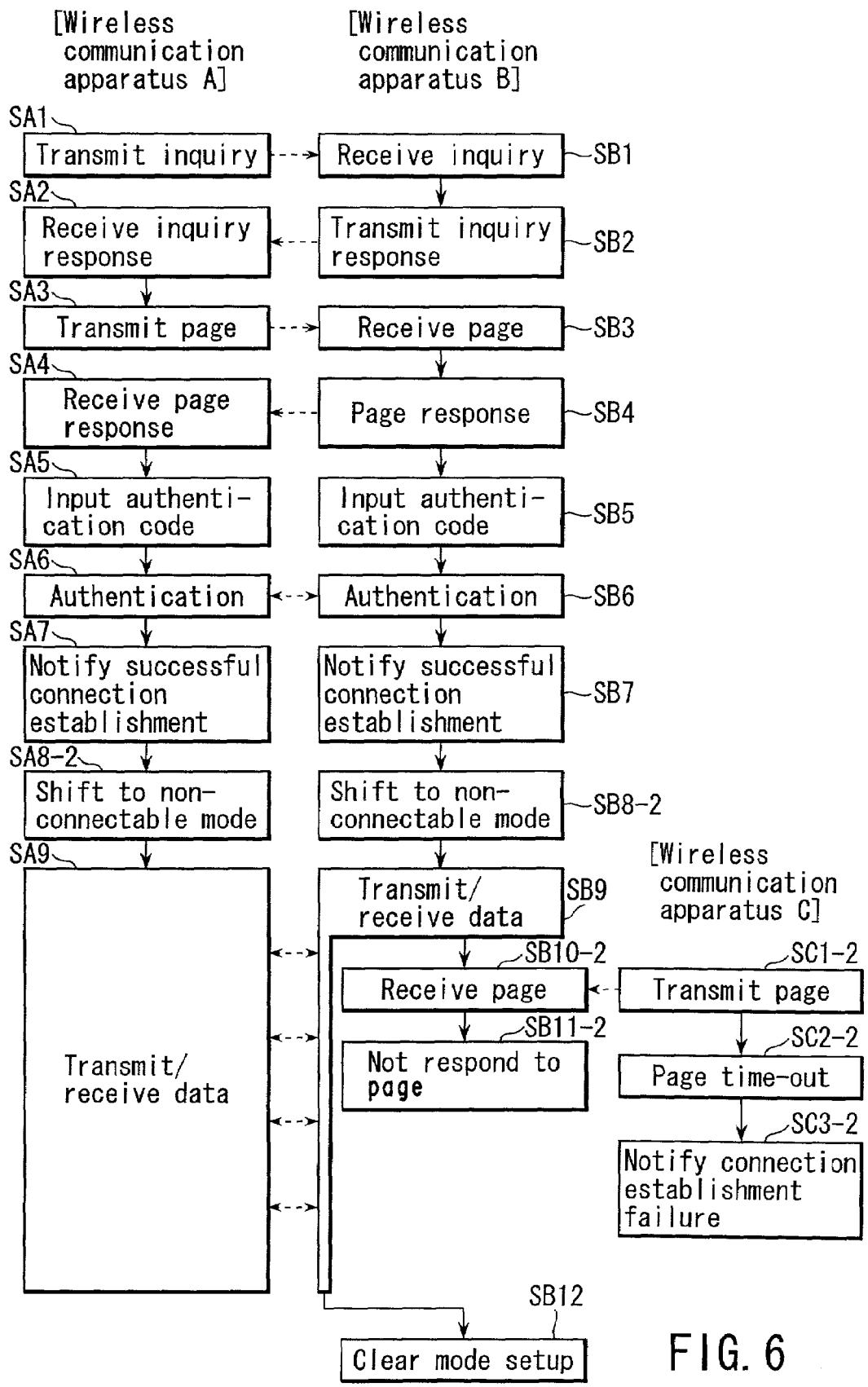
FIG. 6 is a flow chart for explaining the operation of a wireless communication apparatus according to the third embodiment of the present invention.

The operation of a wireless communication apparatus according to the third embodiment of the present invention will be described with reference to the flow chart of FIG. 6.

The process up to establishing connection between wireless communication apparatuses A and B, i.e., the process from step SA1 to step SA7 and from step SB1 to step SB8 is the same as that shown in FIG. 4.

If a control unit 12 determines in step SA7 in the wireless communication apparatus A or in step SB7 in the wireless communication apparatus B that connection has been established, the control unit 12 notifies a mode setup unit 13 of connection establishment.

In the wireless communication apparatus A, the mode setup unit 13 sends, to the control unit 12 in accordance with a preset mode setup, an instruction for shifting to the non-connectable mode in which the wireless communication apparatus A does not respond to a received page. Also in the wireless communication apparatus B, the mode setup unit 13 sends to the control unit 12 an instruction for shifting to the non-connectable mode in which the wireless communication apparatus B does not respond to a received page. Note that mode setup tables 18 of the wireless communication apparatuses A and B are so set as to shift the mode to the non-connectable mode when connection is established between the wireless communication apparatuses A and B. After connection is established between the wireless communication apparatuses A and B, the mode automatically shifts to the non-connectable mode in which the wireless communication apparatus does not respond to a received page (SA8-2 and SB8-2).

Assume that a third wireless communication apparatus C wants connection with the wireless communication apparatus B. Further, assume that the wireless communication apparatus C acquires the unique address of the wireless communication apparatus B in advance by sending an inquiry and receiving an inquiry response before the wireless communication apparatus B shifts to the non-discoverable mode.

In step SC1-2, the wireless communication apparatus C designates the unique address of the wireless communication apparatus B and transmits a page. In step SB10-2, the wireless communication apparatus B receives the page from the wireless communication apparatus C. However, the wireless communication apparatus B has already shifted to the non-connectable mode. Thus, the control unit 12 does not generate any response data to the page, and does not transmit any response to the page (SB11-1).

The wireless communication apparatus C does not receive any page response from the wireless communication apparatus B. A time-out occurs (SC2-2), and the wireless communication apparatus C fails to establish connection. Since the wireless communication apparatus C fails to establish connection with the wireless communication apparatus B, the control unit 12 notifies a user interface 11 of the connection establishment failure, and causes the user interface 11 to display the connection establishment failure (SC3-2). The wireless communication apparatus C cannot establish connection with the wireless communication apparatus B. The wireless communication apparatus C does not interfere with data transmission/reception between the wireless communication apparatuses A and B in steps SA9 and SB9.

The wireless communication apparatus according to the third embodiment shifts to the non-connectable mode after connection establishment, and does not respond to a page signal from another wireless communication apparatus. This can prevent interference with communication with a connected wireless communication apparatus.

The above embodiments have separately described shift to the non-connectable mode and shift to the non-discoverable mode. However, the wireless communication apparatus may simultaneously shift to the non-connectable mode and non-discoverable mode after connection is established.

In the above embodiments, the third wireless communication apparatus C sends a paging signal to the wireless communication apparatus B which receives a page from the wireless communication apparatus A and responds to the page to establish the first connection with the wireless communication apparatus A. The present invention is also effective when the wireless communication apparatus C sends a paging signal to the wireless communication apparatus A because the wireless communication apparatus A also automatically shifts to the non-discoverable mode or non-connectable mode after the first connection is established.

As described above, the wireless communication apparatus of the embodiments establishes connection with another wireless communication apparatus, and then automatically changes setups for an inquiry or paging with respect to still another wireless communication apparatus. The wireless communication apparatus does not send back any response or sends back an inquiry denial response, thereby denying connection establishment with still another wireless communication apparatus except for the currently connected wireless communication apparatus. This can prevent interference with communication between currently connected wireless communication apparatuses.

The present invention is not limited to the above-described embodiments, and can be variously modified without departing from the spirit and scope of the invention in practical use. The respective embodiments can be combined as properly as possible. In this case, the effects of the combination can be obtained. The embodiments include inventions on various stages, and various inventions can be extracted by an appropriate combination of building components disclosed. For example, when an invention is extracted by omitting several building components from all the building components described in the embodiments, the omission is properly compensated for by a well-known technique in practicing the extracted invention.

As has been described in detail, the present invention can provide a wireless communication apparatus which, after establishing connection with another wireless communication apparatus, denies connection establishment with still another wireless communication apparatus except for the currently connected wireless communication apparatus, and does not interfere with communication between the currently connected wireless communication apparatuses.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A wireless communication apparatus comprising:
a unit configured to set up a first mode where the wireless communication apparatus is connectable with at least a first wireless communication device and a second wireless communication device and accepts a connection request from the first wireless communication device;
a unit configured to establish a connection with the first wireless communication device;
a unit configured to discover a completion of the connection with the first wireless communication device;
a unit configured to set up a second mode where, in a state where the connection with the first wireless communication device is established, the wireless communication apparatus is inhibited from establishing a connection with the second wireless communication device with respect to a connection request from the second wireless communication device; and
a unit configured to shift from the first mode to the second mode when said discovering unit discovers the completion of the connection.

2. An apparatus according to claim 1, wherein the second mode includes a non-discoverable mode in which the wireless communication apparatus does not respond to an inquiry signal.

3. An apparatus according to claim 1, wherein the second mode includes a non-connectable mode in which no connection is performed for paging.

4. An apparatus according to claim 2, wherein the second mode includes a non-discoverable mode based on a Bluetooth standard.

5. An apparatus according to claim 3, wherein the second mode includes a non-connectable mode based on a Bluetooth standard.

6. An apparatus according to claim 4, wherein the non-discoverable mode does not respond to an inquiry.

7. An apparatus according to claim 5, wherein the non-connectable mode sends a connection denial response to a paging signal.

8. An apparatus according to claim 5, wherein the non-connectable mode does not respond to a paging signal.

9. An apparatus according to claim 1, wherein the second mode includes a non-discoverable mode and non-connectable mode based on a Bluetooth standard.

10. An apparatus according to claim 1, wherein the second mode inhibits connection with another wireless communication apparatus.

11. An apparatus according to claim 1, wherein the second mode is canceled after end of communication with the first wireless communication device.

12. A communication method in a wireless communication apparatus, comprising:
setting up a first mode where the wireless communication apparatus is connectable with at least a first wireless communication device and a second wireless communication device and accepts a connection request from the first wireless communication device;
establishing a connection with the first wireless communication device;
discovering a completion of the connection with the wireless communication apparatus;
setting up a second mode where, in a state where the connection with the first wireless communication device is established, the wireless communication apparatus is inhibited from establishing a connection with the second wireless communication device with respect to a connection request from the second wireless communication device; and shifting from the first mode to the second mode after the completion of the connection.

13. A method according to claim 12, wherein the second mode includes a non-discoverable mode in which the wireless communication apparatus does not respond to an inquiry signal.

14. A method according to claim 12, wherein the second mode includes a non-connectable mode in which no connection is performed for paging.

15. A method according to claim 13, wherein the second mode includes a non-discoverable mode based on a Bluetooth standard.

16. A method according to claim 14, wherein the second mode includes a non-connectable mode based on a Bluetooth standard.

17. A method according to claim 15, wherein the wireless communication apparatus does not respond to an inquiry signal from another wireless communication apparatus after shifting to the second mode.

18. A method according to claim 16, wherein the wireless communication apparatus sends a connection denial response to a paging signal after shifting to the second mode.

19. A method according to claim 16, wherein the wireless communication apparatus does not respond to a paging signal after shifting to the second mode.

20. A communication apparatus comprising:

a unit configured to establish a connection with a first wireless communication apparatus in a first mode; and a unit configured to control a connection from a second wireless communication apparatus when the connection with the first wireless communication apparatus is established, wherein the control unit sets up a second mode in which, in a state where the connection with the first wireless communication device is established, the communication apparatus is inhibited from establishing a connection with the second wireless communication apparatus with respect to a connection request from the second wireless communication device.

21. A communication method in a communication apparatus, comprising:

establishing a connection with a first wireless communication apparatus in a first mode; and controlling a connection from a second wireless communication apparatus when the connection with the first wireless communication apparatus is established, wherein controlling includes setting up a second mode in which, in a state where the connection with the first wireless communication device is established, the communication apparatus is inhibited from establishing a connection with the second wireless communication apparatus with respect to a connection request from the second wireless communication device.

* * * * *